United States Patent
Cho

(10) Patent No.: US 11,695,109 B2
(45) Date of Patent: Jul. 4, 2023

(54) POSITIVE ELECTRODE ACTIVE MATERIAL, PREPARING METHOD THEREFOR, AND LITHIUM SECONDARY BATTERY INCLUDING SAME

(71) Applicant: Samsung SDI Co., Ltd., Yongin-si (KR)

(72) Inventor: Kwanghwan Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 235 days.

(21) Appl. No.: 16/959,966

(22) PCT Filed: Apr. 18, 2019

(86) PCT No.: PCT/KR2019/004676
§ 371 (c)(1),
(2) Date: Jul. 2, 2020

(87) PCT Pub. No.: WO2019/235733
PCT Pub. Date: Dec. 12, 2019

(65) Prior Publication Data
US 2021/0075005 A1 Mar. 11, 2021

(30) Foreign Application Priority Data
Jun. 7, 2018 (KR) .......................... 10-2018-0065522

(51) Int. Cl.
*H01M 4/36* (2006.01)
*C01G 53/00* (2006.01)
(Continued)

(52) U.S. Cl.
CPC ............ *H01M 4/366* (2013.01); *C01G 53/42* (2013.01); *H01M 4/0471* (2013.01);
(Continued)

(58) Field of Classification Search
None
See application file for complete search history.

(56) References Cited

U.S. PATENT DOCUMENTS

2007/0231691 A1 10/2007 Abe et al.
2010/0209778 A1 8/2010 Jouanneau-Si Larbi et al.
(Continued)

FOREIGN PATENT DOCUMENTS

CN 102272986 A 12/2011
CN 104752728 A 7/2015
(Continued)

OTHER PUBLICATIONS

Stroeve et al., Improvement of thermal stability of Li batteries by polymer coating of LiMn2O4, 2004, Ind. Eng. Chem. Res., 43, 3314-3324. (Year: 2004).*
(Continued)

*Primary Examiner* — Daniel S Gatewood
(74) *Attorney, Agent, or Firm* — Lewis Roca Rothgerber Christie LLP

(57) ABSTRACT

The present disclosure relates to a positive electrode active material, a preparing method therefor, and a lithium secondary battery including same. A positive electrode active material according to an embodiment comprises: a core including a lithium nickel composite oxide represented by Chemical Formula 1; and a surface layer present on the core and including at least one of a water-soluble ammonium-based organic compound and a water-soluble amine-based organic compound. The details of Chemical Formula 1 are as defined in the specification.

5 Claims, 6 Drawing Sheets

(51) Int. Cl.
| | |
|---|---|
| H01M 4/04 | (2006.01) |
| H01M 4/131 | (2010.01) |
| H01M 4/1391 | (2010.01) |
| H01M 4/525 | (2010.01) |
| H01M 4/62 | (2006.01) |
| H01M 10/0525 | (2010.01) |
| H01M 4/02 | (2006.01) |

(52) U.S. Cl.
CPC ......... *H01M 4/131* (2013.01); *H01M 4/1391* (2013.01); *H01M 4/525* (2013.01); *H01M 4/628* (2013.01); *H01M 10/0525* (2013.01); *C01P 2002/50* (2013.01); *C01P 2002/88* (2013.01); *C01P 2004/62* (2013.01); *C01P 2004/64* (2013.01); *C01P 2004/84* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2011/0065003 A1 | 3/2011 | Ghang et al. | |
| 2011/0076556 A1* | 3/2011 | Karthikeyan | H01M 4/485 429/188 |
| 2013/0244102 A1 | 9/2013 | Golodnitsky et al. | |
| 2014/0057181 A1 | 2/2014 | Lee et al. | |
| 2015/0024280 A1 | 1/2015 | Uchiyama | |
| 2015/0188144 A1* | 7/2015 | Shin | H01M 4/62 427/126.3 |
| 2018/0013129 A1 | 1/2018 | Lee et al. | |

FOREIGN PATENT DOCUMENTS

| | | |
|---|---|---|
| JP | 2007-273108 A | 10/2007 |
| JP | 2010-529608 A | 8/2010 |
| JP | 2013-503449 A | 1/2013 |
| JP | 2014-500597 A | 1/2014 |
| JP | 2015-509265 A | 3/2015 |
| JP | 2016-9614 A | 1/2016 |
| JP | 2017-195020 A | 10/2017 |
| JP | 2017195020 A * | 10/2017 |
| KR | 10-2013-0130862 A | 12/2013 |
| KR | 10-2014-0081741 A | 7/2014 |
| KR | 10-1592658 B1 | 2/2016 |
| KR | 10-2016-0094338 A | 8/2016 |
| KR | 10-2016-0149162 A | 12/2016 |

OTHER PUBLICATIONS

Stroeve, Pieter, et al., "Improvement of Thermal Stability of Li-Ion batteries by Ploymer Coating of LiMn2O4", Department of Chemical Engineering and Materials Science and Institute of Transportation Studies, May 2004, XP055873874, Retrieved from the Internet: URL:https://escholarship.org/content/qt9gp9x6x4/qt9gp9x6x4_noSplash_a0faa782d56bd811c9929071b9f5eaec.pdf [retrieved on Dec. 16, 2021] (35 pages).

EPO Extended European Search Report dated Feb. 22, 2022, issued in corresponding European Patent Application No. 19815843.8. (9 pages).

Vidu, Ruxandra et al., "Improvement of the Thermal Stability of Li-Ion Batteries by Polymer Coating of LiMn$_2$O$_4$", Ind. Eng. Chem. Res. 2004, 43, pp. 3314-3324.

Lee, Yoon-Sung et al., "Improvement of the Cycling Performance and Thermal Stability of Lithium-Ion Cells by Double-Layer Coating of Cathode Materials with Al$_2$O$_3$ Nanoparticles and Conductive Polymer", Appl. Mater. Interfaces 2015, 7, pp. 13944-13951.

Korean Office Action dated Sep. 18, 2020, for corresponding Korean Patent Application No. 10-2018-0065522 (4 pages).

Office action issued in corresponding Chinese Application No. 201980019351.8, dated Dec. 8, 2022, 13pp.

* cited by examiner

POSITIVE ELECTRODE ACTIVE MATERIAL, PREPARING METHOD THEREFOR, AND LITHIUM SECONDARY BATTERY INCLUDING SAME

CROSS-REFERENCE TO RELATED APPLICATION(S)

This application is a National Phase Patent Application of International Patent Application Number PCT/KR2019/004676, filed on Apr. 18, 2019, which claims priority of Korean Patent Application No. 10-2018-0065522, filed Jun. 7, 2018. The entire contents of both of which are incorporated herein by reference.

TECHNICAL FIELD

A positive electrode active material, a preparing method therefor, and a lithium secondary battery including same are disclosed.

BACKGROUND ART

A battery transforms chemical energy generated from an electrochemical redox reaction of a chemical material in the battery into electrical energy. Such a battery is divided into a primary battery, which should be disposed after the energy of the battery is all consumed, and a secondary battery, which may be recharged many times. The secondary battery may be charged/discharged many times based on the reversible transformation between chemical energy and electrical energy.

Recent developments in high-tech electronics have allowed electronic devices to become small and light in weight, which leads to an increase in portable electronic devices. As a power source for such portable electronic devices, the demands for batteries with high energy density are increasing and researches on lithium secondary battery are briskly under progress.

The lithium secondary battery is manufactured by an injecting electrolyte into a battery cell, which includes a positive electrode including a positive electrode active material capable of intercalating/deintercalating lithium and a negative electrode including a negative electrode active material capable of intercalating/deintercalating lithium.

The positive electrode active material includes a lithium-containing compound reversibly intercalating and deintercalating lithium, for example, a lithium cobalt oxide, a lithium manganese oxide, a lithium nickel oxide, and the like.

When a process of reversibly intercalating and deintercalating lithium is repeated, residual lithium is generated on the surface of the positive electrode active material, and thus cycle characteristics of the battery and stability may be deteriorated. In order to solve this, when water washing and drying are performed, a problem arises in that the capacity and cycle-life of a battery decreases and a surface resistance of the active material increases.

Therefore, in order to provide a lithium secondary battery capable of securing more excellent cycle characteristics and safety, there is a need for a technology capable of reducing residual lithium on the surface of a positive electrode active material.

DISCLOSURE

Technical Problem

The present invention is to provide a positive electrode active material having much improved cycle characteristics and safety as well as securing characteristics of reducing residual lithium on the surface, a method of the positive electrode active material, and a lithium secondary battery including the same.

Technical Solution

A positive electrode active material according to an embodiment includes a core including lithium nickel composite oxide represented by Chemical Formula 1, and a surface layer present on the core and including at least one of a water-soluble ammonium-based organic compound and a water-soluble amine-based organic compound.

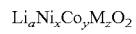  [Chemical Formula 1]

In Chemical Formula 1,

M is one or two or more a metal element selected from Al, Mn, Cr, Fe, V, Mg, Ti, Zr, Nb, Mo, W, Cu, Zn, Ga, In, Sn, La, and Ce, $0.9 \leq a \leq 1.05$,
$0.7 \leq x \leq 1.0$,
$0.01 \leq y \leq 0.3$,
$0.01 \leq z \leq 0.3$, and
$x+y+z=1$.

A method for preparing a positive electrode active material according to another embodiment includes (i) forming a positive electrode active material through a heat treatment process, and (ii) washing the positive electrode active material with washing water including at least one of a water-soluble ammonium-based organic compound and a water-soluble amine-based organic compound.

A lithium secondary battery according to another embodiment includes a positive electrode including a positive electrode current collector, and a positive electrode active material layer disposed on the positive electrode current collector, a negative electrode facing the positive electrode and including a negative electrode current collector and a negative electrode active material layer disposed on the negative electrode current collector, and an electrolyte, wherein the positive electrode active material layer includes the aforementioned positive electrode active material or the positive electrode active material prepared according to the preparing method, and a positive electrode binder.

Advantageous Effects

According to the present disclosure, generation of residual lithium on the surface of the positive electrode active material may be prevented to provide a positive electrode active material capable of ensuring cycle characteristics and safety of the battery, a method for preparing the positive electrode active material, and a lithium secondary battery including the same.

DESCRIPTION OF SYMBOLS

Figure 1:
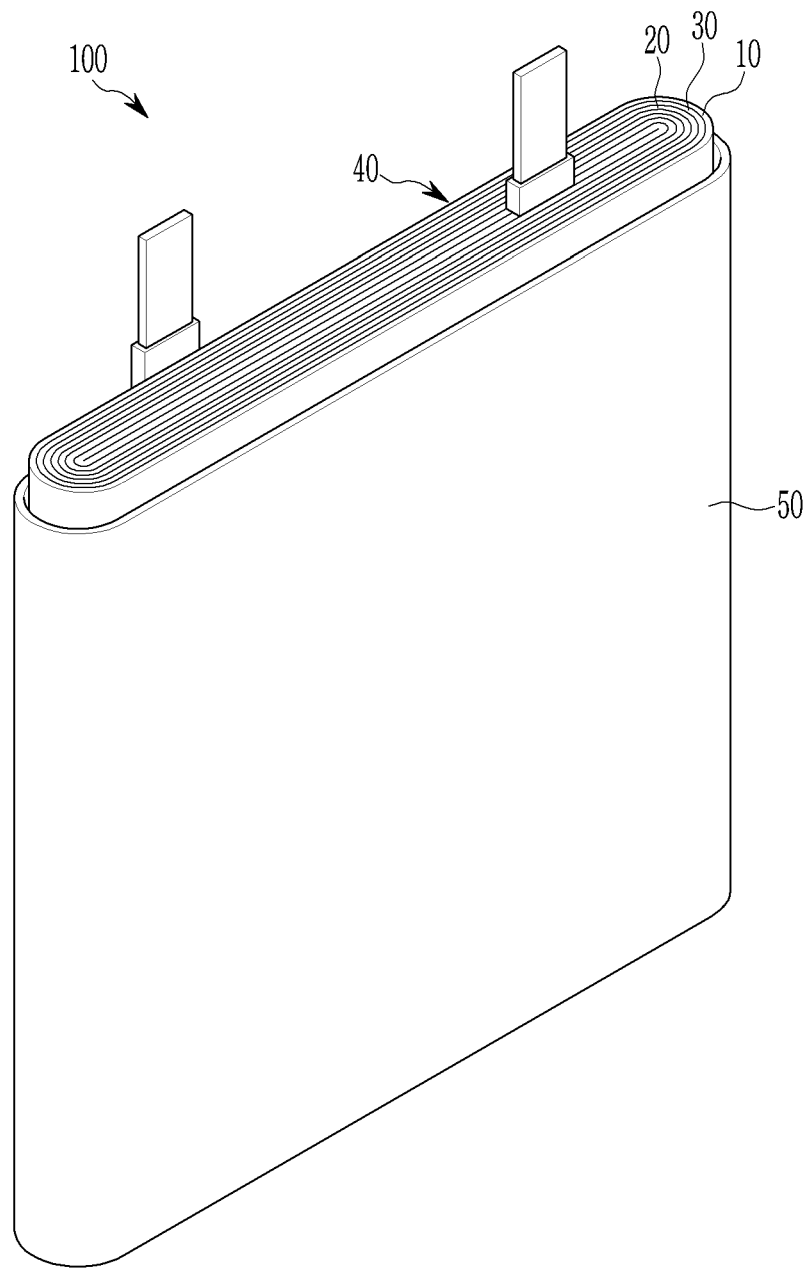
FIG. 1 is a schematic view showing a structure of a lithium secondary battery according to an embodiment.

10: positive electrode
20: negative electrode
30: separator
40: electrode assembly
50: case
100: lithium secondary battery

MODE FOR INVENTION

Hereinafter, the embodiments of the present invention are described in detail, referring to the accompanying drawings. However, in the description of the present disclosure, descriptions for already known functions or components will be omitted for clarifying the gist of the present disclosure.

Lithium secondary batteries may be classified as lithium ion batteries, lithium ion polymer batteries, and lithium polymer batteries according to the presence of a separator and the type of electrolyte used therein. The lithium secondary batteries may have a variety of shapes and sizes, and include cylindrical, prismatic, coin, or pouch-type batteries, and may be thin film batteries or may be rather bulky in size. Structures and manufacturing methods for lithium ion batteries pertaining to this disclosure are well known in the art.

Herein, as an example of the lithium secondary battery, a rectangular lithium secondary battery is described as an example. FIG. 1 is a schematic view showing a structure of a lithium secondary battery according to an embodiment. Referring to FIG. 1, a lithium secondary battery 100 according to an embodiment includes an electrode assembly 40 wound by disposing a separator 30 between the positive electrode 10 and the negative electrode 20 and a case 50 housing the electrode assembly 40.

The electrode assembly 40 may be, for example, in the form of a jelly roll formed by winding the positive electrode 10 and the negative electrode 20 with the separator 30 therebetween. The positive electrode 10, the negative electrode 20, and the separator 30 are impregnated with an electrolyte (not shown).

Hereinafter, a more detailed configuration of the lithium secondary battery 100 according to an embodiment of the present invention is described.

A lithium secondary battery according to an embodiment of the present invention includes a positive electrode including a positive electrode current collector and a positive electrode active material layer disposed on the positive electrode current collector, a negative electrode facing the positive electrode and including a negative electrode current collector and a negative electrode active material layer disposed on the negative electrode current collector, and an electrolyte.

The positive electrode current collector may include aluminum or nickel, but is not limited thereto.

The positive electrode active material according to an embodiment may include a core and a surface layer present on the core, and may have, for example, a core-shell structure.

The core may use a compound capable of reversibly intercalating and deintercalating lithium. For example, the core may include a lithium nickel composite oxide represented by Chemical Formula 1.

  [Chemical Formula 1]

In Chemical Formula 1,
M is one or two or more a metal element selected from Al, Mn, Cr, Fe, V, Mg, Ti, Zr, Nb, Mo, W, Cu, Zn, Ga, In, Sn, La, and Ce,
$0.9 \leq a \leq 1.05$,
$0.7 \leq x \leq 1.0$,
$0.01 \leq y \leq 0.3$,
$0.01 \leq z \leq 0.3$, and
$x+y+z=1$.

In Chemical Formula 1, x may be in the range of $0.7 \leq x < 1$. The lithium nickel composite oxide represented by Chemical Formula 1 has a relatively high ratio of nickel atom content relative to lithium atom content and thus may realize a high-capacity lithium secondary battery.

For example, the M may be Al. When the M is Al, a cycle-life of a lithium secondary battery may be improved, and an exothermic onset temperature is increased to improve thermal stability. In addition, when the M is Al and Mg, since the onset temperature is not only increased, but also the amount of the exothermic heat is reduced, thermal stability of the secondary battery may be improved. When Al and Mg are doped in appropriate amounts, the lithium secondary battery may have excellent capacity and simultaneously, realize the aforementioned effects.

The surface layer is present on the core and specifically, a portion of the surface or the whole surface of the core, and includes at least one of a water-soluble ammonium-based organic compound and a water-soluble amine-based organic compound. For example, the water-soluble ammonium-based organic compound may be a water-soluble alkyl ammonium-based organic compound. For example, the water-soluble ammonium-based organic compound may be a water-soluble ammonium-based polymer, and the water-soluble alkyl ammonium-based organic compound may be, for example, poly(diallyldimethyl ammonium chloride) (PDDA), poly(acrylamido-co-diallyldimethyl ammonium chloride), or a combination thereof.

For example, the water-soluble amine-based organic compound may be a water-soluble amine-based polymer, for example, poly(allyl amine chloride), poly(2-dimethylamino) ethyl methacrylate methyl chloride, or a combination thereof.

For example, the surface layer may be present as an island shape on the portion of the surface of the core, and an area of the surface layer may be 0.1% to 10% of the surface area of the core. According to one embodiment, the surface layer is present on the core of the positive electrode active material and thus may prevent generation of residual lithium on the surface thereof and resultantly, secure cycle characteristics and safety of a battery.

Herein, the surface layer may further include metal oxide. Like one embodiment, when the surface layer further includes metal oxide, a cycle-life of the positive electrode active material may be further improved, and passivation of the positive electrode active material may not only be maintained, but also a binding force may be improved.

The metal oxide may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, $HfO_2$, boehmite, or a combination thereof, but is not limited thereto.

The metal oxide may be sphere-shaped, sheet-shaped, flake-shaped, and the like, for example, sphere-shaped.

For example, the sphere-shaped metal oxide may have an average particle diameter of 1 nm to 1000 nm. For example, the metal oxide may have an average particle diameter of 100 nm to 800 nm, for example, 100 nm to 800 nm, for example, 100 nm to 700 nm, or for example, 100 nm to 500 nm.

The average particle diameter may be a particle size (D50) at a volume ratio of 50% in a cumulative size-distribution curve. The particle diameter may be measured by using a particle size analyzer (e.g.: Bluewave made by Microtrac Retsch GmbH).

The metal oxide may be included in an amount of 1 wt % to 10 wt % based on a total weight of the surface layer. When the metal oxide is included within the range, generation of residual lithium may be prevented on the surface of the positive electrode active material, securing of a battery.

On the other hand, a method of preparing a positive electrode active material according to an embodiment includes (i) forming a positive electrode active material through a heat treatment process, and (ii) washing the positive electrode active material with washing water including at least one of a water-soluble ammonium-based organic compound and a water-soluble amine-based organic compound. The surface layer may be formed through a washing process of using washing water.

The (i) forming of the positive electrode active material may be performed in a common manufacturing process widely-known in a related art.

The positive electrode active material according to an embodiment may be prepared by primarily firing a nickel cobalt precursor to obtain a nickel cobalt composite oxide, mixing the nickel cobalt composite oxide with a metal oxide having an average particle diameter of 1 nm to 1000 nm and a lithium precursor, and secondarily firing the mixture.

The nickel cobalt precursor may be, for example, nickel cobalt acetate, nickel cobalt nitrate, nickel cobalt hydroxide, nickel cobalt carbonate, nickel cobalt hydrate, or a combination thereof. The nickel cobalt precursor may include Ni/Co in a mole ratio of 80/20 to 95/5, for example, in a mole ratio of 85/15 to 93/7.

The primary firing process may be performed at 500° C. to 700° C., and herein, the heat treatment may be performed for 10 hours to 30 hours. The heat treatment process may be performed under an air atmosphere.

The nickel cobalt composite oxide may be a mixture of nickel cobalt composite oxides made from at least two types of nickel cobalt precursors having different particle diameter sizes, wherein the larger particle diameter may be about 10 μm to 20 μm, while the smaller particle diameter may be about 1 μm to 5 μm, and the large and small particle diameter nickel cobalt composite oxides may be included in a weight ratio of 90:20 to 80:10.

The metal oxide may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, $HfO_2$, boehmite, or a combination thereof and may be mixed in an amount of 1 to 10 mol % of the total active material.

The lithium precursor may be, for example, lithium acetate, lithium nitrate, lithium hydroxide, lithium carbonate, lithium acetate, hydrate thereof, or a combination thereof and used to include 1 mole or more of Li based on a total mole of metals (excluding Li).

The secondary firing process may be performed at 650° C. to 850° C., and herein, the heat treatment may be performed for 10 hours to 30 hours. The heat treatment process may be performed under an oxygen ($O_2$) atmosphere.

The mixing process may be, for example, performed through a mechanical mixing process such as ball milling and the like.

Subsequently, (ii) the washing process is performed to remove residual lithium on the surface of the positive electrode active material.

The washing process may be performed by using, for example, the washing water including at least either one of the water-soluble ammonium-based organic compound and the water-soluble amine-based organic compound.

At least one of the water-soluble ammonium-based organic compound and the water-soluble amine-based organic compound may be included in an amount of 0.1 wt % to 10 wt % based on a total weight of the washing water. For example, the water-soluble ammonium-based organic compound may be included in an amount of 1 wt % to 10 wt % based on a total weight of the washing water, for example, included in an amount of 2 wt % to 7 wt % based on the total weight of the washing water.

Herein, the washing water may further include metal oxide, and the washing of the positive electrode active material may be washing the positive electrode active material with the washing water further including the metal oxide. The metal oxide included in the washing water may be the same as the metal oxide added to manufacture the lithium nickel composite oxide-containing core.

As aforementioned, when the metal oxide is further included in the washing solution, this washing process may form the surface layer including the metal oxide on the surface of the positive electrode active material. Accordingly, the surface layer including the metal oxide may further improve a cycle-life of the positive electrode active material and also improve a binding force as well as maintain passivation of the positive electrode active material.

For example, the metal oxide may be included in an amount of 0.1 wt % to 5 wt % based on a total weight of the washing water. For example, the metal oxide may be included in an amount of 1 wt % to 5 wt % based on the total weight of the washing water, for example, 1 wt % to 3 wt % based on a total weight of the washing water.

After the washing process, the drying is performed to obtain the positive electrode active material. Herein, the positive electrode active material may have, for example, the core-shell structure.

In the present disclosure, the positive electrode 10 including the positive electrode active material for a lithium secondary battery according to the present disclosure may be used.

The positive electrode 10 includes a positive electrode active material layer on a positive electrode current collector. The positive electrode active material layer includes a positive electrode active material, which may include the positive electrode active material for a lithium secondary battery according to an embodiment.

In the positive electrode active material layer, a content of the positive electrode active material may be 90 wt % to 98 wt % relative to a total weight of the positive electrode active material layer.

In an embodiment, the positive electrode active material layer may further include a binder and a conductive material. Herein, a content of the binder and the conductive material may be 1 wt % to 5 wt %, respectively, based on a total weight of the positive electrode active material layer.

The binder adheres the positive electrode active material particles to each other well, and also serves to adhere the positive electrode active material to the current collector. Examples of the binder may include polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is used to impart conductivity to the electrode, and any electronically conductive material may be used as long as it does not cause chemical changes in the configured battery. Examples of the conductive material may include a carbon-based material such as natural graphite, artificial graphite, carbon black, acetylene black, ketjen black, a carbon fiber, and the like; a metal-based material such as a metal powder or a metal fiber of copper, nickel, aluminum silver, and the like, and the like; a conductive polymer such as a polyphenylene derivative, and the like; or a mixture thereof.

The positive electrode current collector may be an aluminum foil, a nickel foil, or a combination thereof, but is not limited thereto.

Next, the negative electrode 20 includes a negative electrode current collector and a negative electrode active material layer disposed on the current collector. The negative electrode active material layer includes a negative electrode active material.

The negative electrode active material may include a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may be, for example, a carbon material, that is a generally-used carbon-based negative electrode active material in a lithium secondary battery. Typical examples of the carbon-based negative electrode active material may be crystalline carbon, amorphous carbon, or a combination thereof. Examples of the crystalline carbon include graphite such as non-shaped, plate-like, flake-shaped, sphere-shaped, or fiber-shaped natural graphite or artificial graphite, and examples of the amorphous carbon include soft carbon or hard carbon, a mesophase pitch carbonized product, calcined coke, and the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may include a silicon-based material, for example, Si, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), a Si-carbon composite, Sn, $SnO_2$, Sn—R (wherein R is an element selected from an alkali metal, an alkaline-earth metal, a Group 13 element, a Group 14 element, a Group 15 element, a Group 16 element, a transition metal, a rare earth element, and a combination thereof and not Sn), a Sn-carbon composite, and the like, and at least one of them may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The lithium titanium oxide may be a transition metal oxide.

In the negative electrode active material layer, the negative electrode active material may be included in an amount of 95 wt % to 99 wt % based on the total weight of the negative electrode active material layer.

The negative electrode active material layer includes a negative electrode active material and a binder, and may optionally further include a conductive material.

In the negative electrode active material layer, the negative electrode active material may be included in an amount of 95 wt % to 99 wt % based on the total weight of the negative electrode active material layer. A content of the binder in the negative electrode active material layer may be 1 wt % to 5 wt % based on a total weight of the negative electrode active material layer. In addition, when the conductive material is further included, 90 wt % to 98 wt % of the negative electrode active material, 1 wt % to 5 wt % of the binder, and 1 wt % to 5 wt % of the conductive material may be used.

The binder adheres the negative electrode active material particles to each other well, and also serves to adhere the negative electrode active material to the current collector. The binder may be a water-insoluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used as a thickener to provide viscosity. The cellulose-based compound includes one or more of carboxymethyl cellulose, hydroxypropylmethyl cellulose, methyl cellulose, or alkali metal salts thereof. The alkali metals may be Na, K, or Li. Such a thickener may be included in an amount of 0.1 to 3 parts by weight based on 100 parts by weight of the negative electrode active material.

The conductive material is used to impart conductivity to the electrode, and any electronically conductive material may be used as long as it does not cause chemical changes in the configured battery. The conductive material may include: a carbon-based material such as natural graphite, artificial graphite, carbon black, acetylene black, ketjen black, denka black, a carbon fiber, and the like; a metal-based material of a metal powder or a metal fiber including copper, nickel, aluminum, silver, and the like; a conductive polymer such as a polyphenylene derivative; or a mixture thereof.

The negative electrode current collector may be selected from a copper foil, a nickel foil, a stainless steel foil, a titanium foil, a nickel foam, a copper foam, a polymer substrate coated with a conductive metal, and a combination thereof.

Meanwhile, as illustrated in FIG. 1, the electrode assembly 10 may be formed into a flat structure by spirally winding the separator 30 disposed between the band-shaped positive electrode 10 and negative electrode 20 and then pressing them. Alternatively, although not illustrated, a plurality of positive and negative electrodes formed in a shape of a square sheet may be alternately stacked.

In addition, the positive electrode 10, the negative electrode 20 and the separator 30 may be impregnated in the electrolyte.

The separator 30 separates the positive electrode 10 from the negative electrode 20 and provides a passage for lithium ions, and may be used as long as it is commonly used in lithium secondary batteries. In other words, it may have low resistance to ion transport and excellent impregnation for an electrolyte. The separator 30 may be, for example, selected from a glass fiber, polyester, polyethylene, polypropylene, polytetrafluoroethylene, or a combination thereof. It may have a form of a non-woven fabric or a woven fabric. For example, in a lithium secondary battery, a polyolefin-based polymer separator such as polyethylene and polypropylene is mainly used, in order to ensure the heat resistance or mechanical strength, a coated separator including a ceramic component or a polymer material may be used, and optionally, it may have a mono-layered or multi-layered structure.

The electrolyte contains a non-aqueous organic solvent and a lithium salt.

The non-aqueous organic solvent serves as a medium for transporting ions taking part in the electrochemical reaction of a battery.

The non-aqueous organic solvent may be a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC). and the like and the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran and the like, and the ketone-based solvent may be cyclohexanone, and the like. The alcohol-based solvent may include ethanol, isopropyl alcohol, and the like, and the aprotic solvent may include nitriles such as R—CN (wherein R is a C2 to C20 linear, branched, or cyclic hydrocarbon group, a double bond, an aromatic ring, or an ether bond), and the like, amides such as dimethyl formamide, and the like, dioxolanes such as 1,3-dioxolane, and the like, sulfolanes, and the like.

The non-aqueous organic solvent may be used alone or in a mixture. When the organic solvent is used in a mixture, the mixture ratio may be controlled in accordance with a desirable battery performance.

In addition, in the case of a carbonate-based solvent, it is desirable to use a mixture of cyclic carbonate and chain carbonate. Herein, the mixture of the cyclic carbonate and the chain carbonate in a volume ratio of 1:1 to 1:9 may be used to exhibit excellent electrolyte performance.

The non-aqueous organic solvent of the present disclosure may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 3.

[Chemical Formula 3]

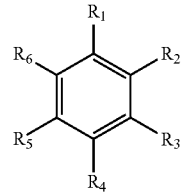

In Chemical Formula 3, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound of Chemical Formula 4 in order to improve battery cycle-life.

[Chemical Formula 4]

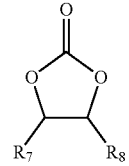

In Chemical Formula 4, $R_7$ and $R_8$ are the same or different, and selected from hydrogen, a halogen, a cyano group (CN), a nitro group ($NO_2$), a fluorinated C1 to C5 alkyl group, provided that at least one of $R_7$ and $R_8$ is selected from a halogen, a cyano group (CN), a nitro group ($NO_2$), and a fluorinated C1 to C5 alkyl group and both $R_7$ and $R_8$ are not hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. When the additive for improving the cycle-life is further used, its use amount may be adjusted appropriately.

The lithium salt dissolved in the organic solvent may act as a source of lithium ion in the battery, enabling a basic operation of a lithium secondary battery and promoting the movement of lithium ions between the positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, where x and y are natural numbers, LiCl, LiI, and $LiB(C_2O_4)_2$ (lithium bis(oxalato) borate; LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Meanwhile, the separator 30 disposed between the positive electrode 10 and the negative electrode 20 may be a polymer film. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The case 50 may be composed of a lower exterior 22 and an upper exterior 21, and the electrode assembly 10 is housed in an internal space 221 of the lower exterior 22.

After the electrode assembly 10 is housed in the case 50, a sealing member 222 is applied on a border of the lower exterior 22 to seal the upper exterior 21 and the lower exterior 22. Herein, the positive terminal 40 and the negative terminal 50 may wrap an insulation member 60 contacting the case 20 and thus improve durability of the lithium secondary battery 100.

A lithium secondary battery according to the present embodiment may have an operation voltage, for example, in a range of 4.2 V to 4.55 V and specifically, 4.25 V to 4.5 V. In the present specification, the operation voltage of the lithium secondary battery is based on a half coin cell.

As described, in the above present disclosure, the positive electrode active material according to an embodiment is included, and a lithium secondary battery manufactured by applying the same may have significantly improved thermal stability as well as high capacity.

On the other hand, the lithium secondary battery according to an embodiment may be used for a device including one or more thereof. This device may be selected from, for example, a mobile phone, a tablet computer, a laptop computer, a power tool, a wearable electronic device, an electric vehicle, a hybrid electric vehicle, a plug-in hybrid electric vehicle, and a power storage device. The devices to which the lithium secondary battery is applied are well known in the art and thus not illustrated in detail in the present specification. Hereinafter, the above aspects of the present disclosure are illustrated in more detail with reference to examples. However, these examples are exemplary, and the present disclosure is not limited thereto.

(Preparation of Positive Electrode Active Material)

Example 1

Nickel cobalt metal composite hydroxide ($Ni_{0.93}Co_{0.07}(OH)_2$) having a Ni:Co mole ratio of 93:7 and D50 of 16 μm was heat-treated at 600° C. for 12 hours under an air atmosphere to obtain metal composite oxide having a composition of $Ni_{0.93}Co_{0.07}O$. Nickel cobalt metal composite hydroxide ($Ni_{0.87}Co_{0.13}(OH)_2$) having a Ni:Co mole ratio of 87:13 and D50 of 3 μm was heat-treated in the same method as above to obtain a metal composite oxide having a composition of $Ni_{0.87}Co_{0.13}O$.

These two metal composite oxides having different particle diameters were mixed in a weight ratio of 85:15, aluminum oxide ($Al_2O_3$) having an average particle diameter of 100 nm was added thereto in an amount of 2 mol % based on a total weight of an active material, lithium hydroxide NOM was added thereto in a mole ratio of Li/(Ni+Co+Al)=1.07, and then, the mixture was put in a Cordierite sagger and then, fired at 740° C. for 20 hours under an oxygen atmosphere. The fired product of the lithium metal composite oxide had a composition of $Li(Ni_{0.902}Co_{0.078}Al_{0.02})O_2$.

In addition, 3 wt % of PDDA (poly diallylammonium chloride) was mixed with 100 g of water to prepare washing water including PDDA. Subsequently, the lithium metal composite oxide, the water, and the PDDA were mixed in a weight ratio of 1:10:0.25 and then, stirred with a magnetic bar for 30 minutes and then, vacuum-filtered to remove the water. Subsequently, the water was completely removed through vacuum-drying at 150° C. to prepare a positive electrode active material.

Example 2

The lithium metal composite oxide of Example 1, water, and PDDA including 3 wt % of metal oxide ($ZrO_2$) were mixed in a weight ratio of 1:10:0.25, stirred with a magnetic bar for 30 minutes, and vacuum-filtered to remove the water. Subsequently, the water was completely removed through vacuum-drying at 150° C. to prepare a positive electrode active material. The PDDA including 3 wt % of $ZrO_2$ was prepared in a method of mixing water:PDDA:$ZrO_2$ in a weight ratio of 1:0.03:0.001 to 0.01 and stirring the mixture for 30 minutes.

Comparative Example

The lithium metal composite oxide of Example 1 and water were stirred together in a weight ratio of 1:10 for 30 minutes with a magnetic bar and then, vacuum-filtered to remove the water. Subsequently, the water was completely removed through vacuum-drying at 150° C. to prepare a positive electrode active material.

(Production of Lithium Secondary Battery Cell)

Preparation Example 1

The positive electrode active material of Example 1, Denka black as a conductive material, and polyvinylidene fluoride as a binder were mixed in a weight ratio of 91:4:5, and NMP (N-methyl pyrrolidone) was added thereto to prepare a positive electrode slurry. This positive electrode slurry was coated on an aluminum current collector and dried in a vacuum oven at 120° C. to manufacture a positive electrode.

A porous polyethylene separator was disposed between the positive electrode and a lithium metal, and an electrolyte including 1 M $LiPF_6$ lithium salt was injected thereinto to manufacture a half coin-type lithium secondary battery cell.

Preparation Example 2

A half coin-type lithium secondary battery cell was manufactured according to the same method as Preparation Example 1 except that the positive electrode active material of Example 2 was used.

Comparative Preparation Example

A half coin-type lithium secondary battery cell was manufactured according to the same method as Preparation Example 1 except that the positive electrode active material of comparative example was used.

Evaluation Example

1. DSC Analysis

The half coin-type lithium secondary battery cells according to
Preparation Examples 1 and 2 and comparative preparation example were respectively charged up to 4.3 V at a 0.5 C-rate at 60° C. and then, disassembled. Materials of the disassembled positive electrode plates were analyzed through differential scanning calorimetry (DSC) by using Shimadzu DSC-60 (Shimadzu Corp.).

Figure 2:
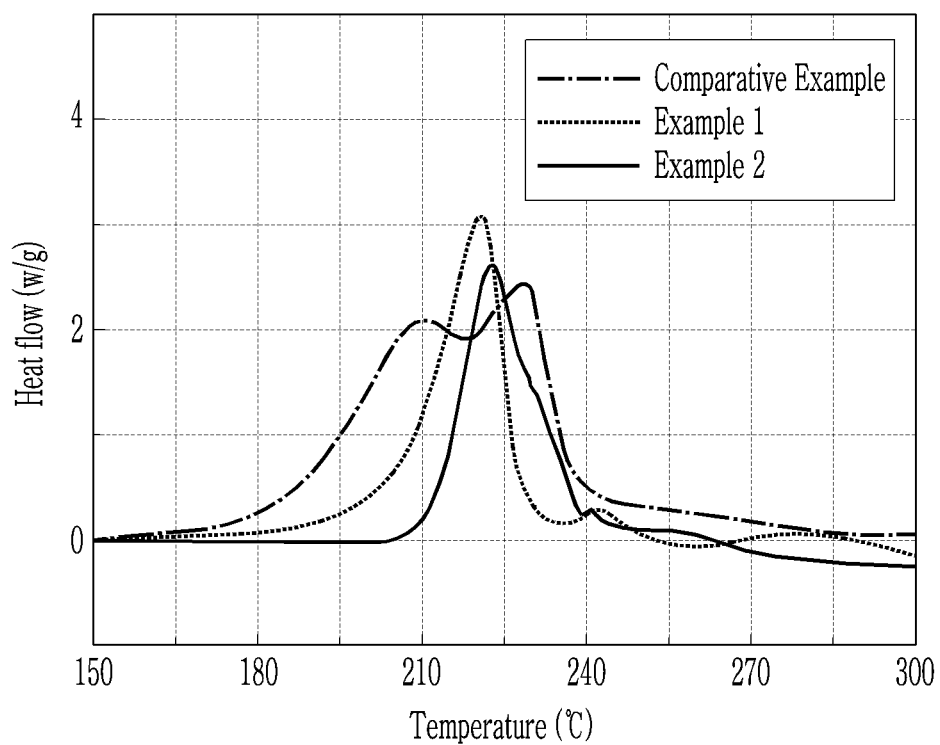
FIG. 2 is a graph showing the results of DSC analysis of the positive electrode active materials according to Examples 1 and 2 and comparative example.

FIG. 2 is a graph showing the DSC analysis results of the positive electrode active materials according to Examples 1 and 2 and comparative example.

Referring to FIG. 2, Examples 1 and 2 exhibited a smaller generated heat amount than comparative example. In addition, onset temperatures of Examples 1 and 2 were higher than that of comparative example. Accordingly, the half coin-type lithium secondary battery cells according to Preparation Examples 1 and 2 exhibited excellent thermal characteristics compared with the coin-type lithium secondary battery cell according to comparative preparation example, and particularly, the battery cell of Preparation Example 2 further including metal oxide in the surface layer exhibited a much smaller generated heat amount and a much higher onset temperature and thus much improved thermal characteristics.

2. Cycle-Life Characteristic Evaluation

Figure 3:
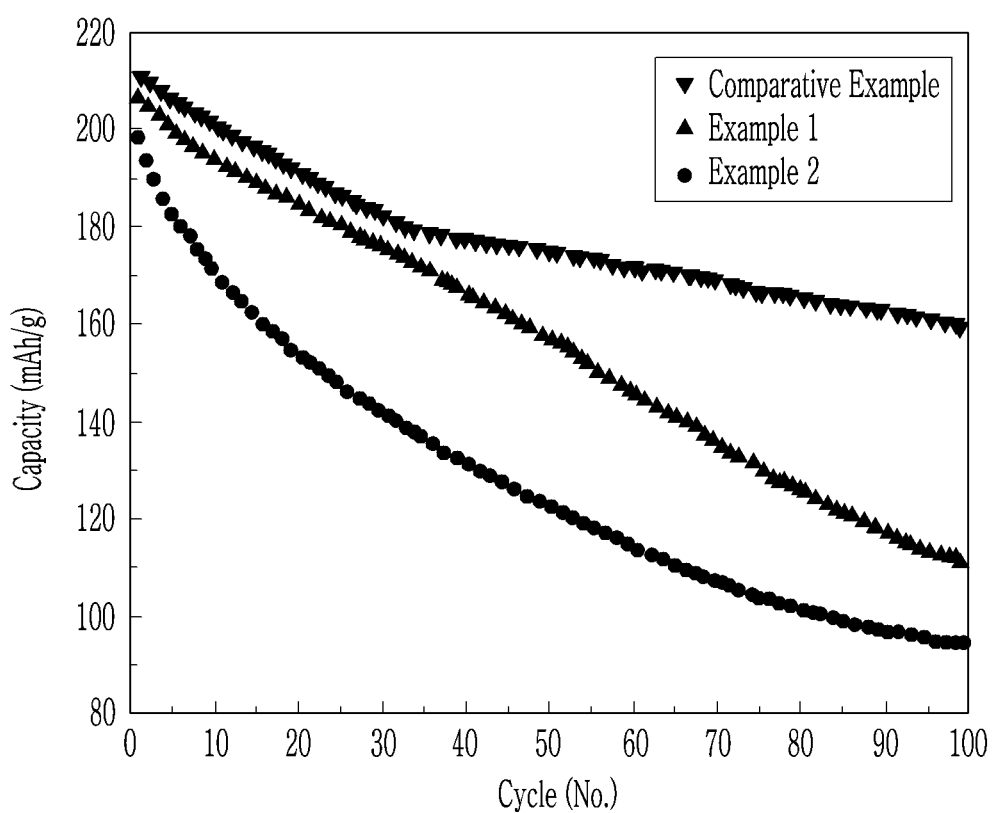
FIG. 3 is a graph showing the discharge capacity of a battery cell versus the number of cycles of the lithium secondary battery cells according to Preparation Examples 1 and 2 and comparative preparation example.

The half coin-type lithium secondary battery cells according to Preparation Examples 1 and 2 and comparative preparation example were charged at 0.1 C and discharged at 0.1 C as the first cycle and then, 100 times charged at 1.0 C and discharged at 1.0 C to measure discharge capacity, and the results are shown in FIG. 3.

Figure 4:
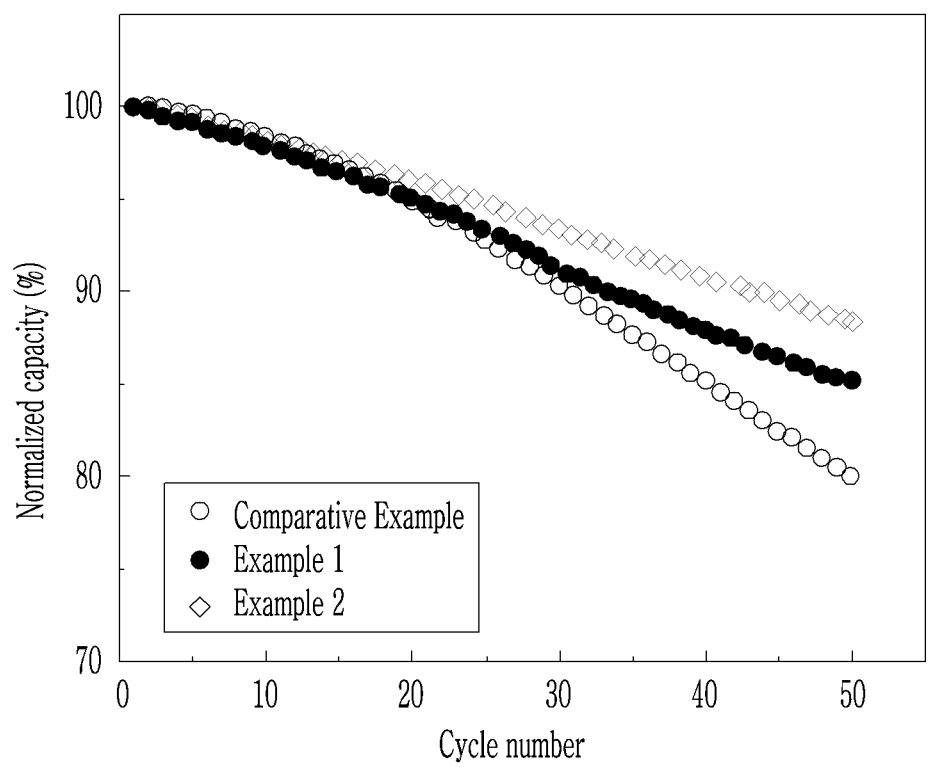
FIG. 4 is a graph showing normalized capacity for cycles of lithium secondary battery cells according to Preparation Examples 1 and 2 and comparative preparation example.

In addition, each discharge capacity measured under the same condition was divided by discharge capacity at the first discharge at 1.0 C and then, multiplied by 100 to obtain percentages as normalized capacity, and the results are shown in FIG. 4.

FIG. 3 is a graph showing the discharge capacity of a battery cell versus the number of cycles of the lithium secondary battery cells according to Preparation Examples 1 and 2 and comparative preparation example.

FIG. 4 is a graph showing normalized capacity for cycles of lithium secondary battery cells according to Preparation Examples 1 and 2 and comparative preparation example.

Referring to FIGS. 3 and 4, the lithium secondary battery cells of Preparation Examples 1 and 2 exhibited an improved cycle-life compared with the lithium secondary battery cell of comparative preparation example, and particularly, the lithium secondary battery cell of Preparation Example 2 further including a metal oxide in the surface layer exhibited much excellent cycle-life characteristics.

3. Initial IR Drop Evaluation

The half coin-type lithium secondary battery cells according to Preparation Examples 1 and 2 and comparative preparation example were charged at 0.1 C and discharged at 0.1 C as the first cycle and then, 100 times charged at 1.0 C and discharged at 1.0 C to measure discharge capacity. Herein, when the discharge at the second cycle started, a voltage was measured, and then, voltages at the subsequent cycles was measured to calculate each voltage difference between the second cycle and each other cycles, and the results are shown in FIG. 5.

Figure 5:
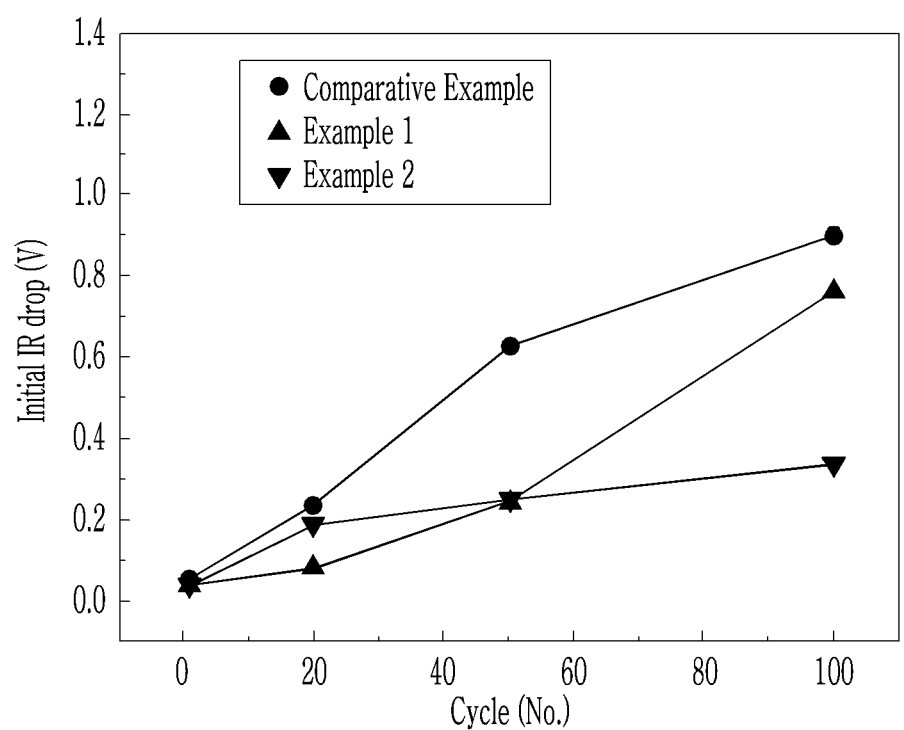
FIG. 5 is a graph showing initial IR drop for the number of cycles of lithium secondary battery cells according to Preparation Examples 1 and 2 and comparative preparation example.

FIG. 5 is a graph showing initial IR drop for the number of cycles of lithium secondary battery cells according to Preparation Examples 1 and 2 and comparative preparation example.

Referring to FIG. 5, the lithium secondary battery cells according to Preparation Examples 1 and 2 exhibited lower voltage drop according to repeated cycles relative to the voltage when the discharge of the second cycle was started, compared with the lithium secondary battery cell according to comparative preparation example, and particularly, the battery cell further including metal oxide in the surface layer according to Preparation Example 2 exhibited much lower voltage drop and thus may be expected to have much improved cycle-life characteristics.

4. Evaluation of Capacity Vs. Voltage Depending on Cycles

Figure 6:
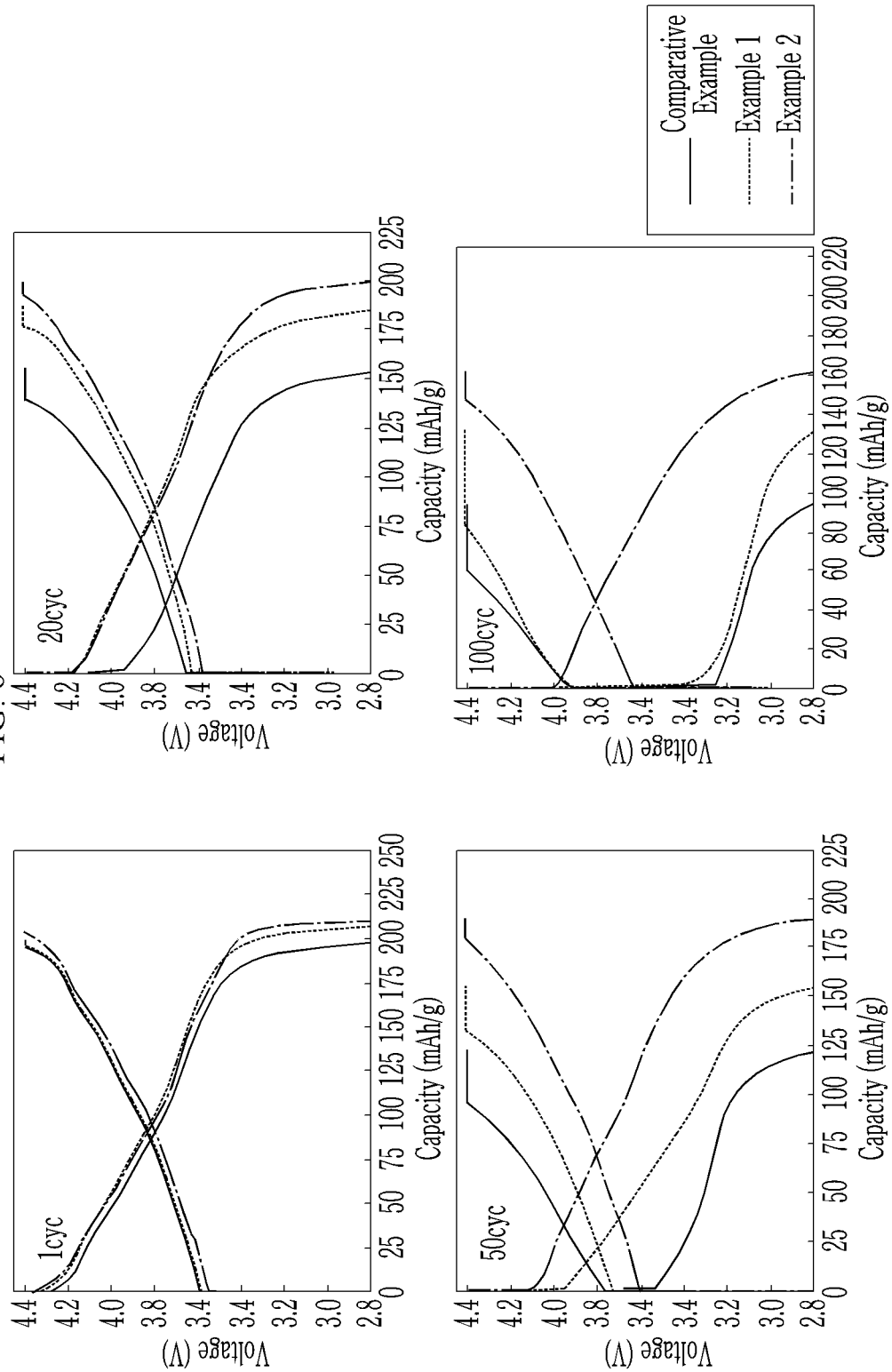
FIG. 6 is a graph showing charge-discharge profiles at the 1st, 20th, 50th, and 100th cycles of the lithium secondary battery cells according to Preparation Examples 1 and 2 and comparative preparation example.

The half coin-type lithium secondary battery cells of Preparation Examples 1 and 2 and comparative preparation example were charged at 0.1 C and discharged at 0.1 C as the first cycle and then, 100 times charged at 1.0 C and discharged at 1.0 C to measure discharge capacity and thus obtain 1.0 C charge and 1.0 C discharge profiles at the 1st 20th 50th, and 100th, and the results are shown in FIG. 6.

FIG. 6 is a graph showing charge-discharge profiles at the $1^{st}$, $20^{th}$, $50^{th}$, and $100^{th}$ cycles of the lithium secondary battery cells according to Preparation Examples 1 and 2 and comparative preparation example.

Referring to FIG. 6, the lithium secondary battery cells of Preparation Examples 1 and 2 exhibited excellent capacity retention according to repetitive cycles compared with the lithium secondary battery cell of comparative preparation example and particularly, the battery cell of Preparation Example 2 further including metal oxide in the surface layer exhibited much improved capacity vs. voltage.

5. Residual Lithium Measurement 10 g of each active material according to Examples 1 to 2 and comparative example was well mixed with 100 ml of distilled water for 15 minutes, and then, the distilled water was filtered by using T50 made by Mettler Toledo. 40 ml of the filtered distilled water was put, and a 10% hydrochloric acid aqueous solution was little by little added thereto for titration. After the titration, two inflection points appears, where the amounts of the added hydrochloric acid aqueous solutions were measured to calculate residual lithium amounts, and the results are shown in Table 1.

TABLE 1

| | $Li_2CO_3$ [wt %] | LiOH [wt %] | Total (ppm) |
|---|---|---|---|
| Example 1 | 0.203 | 0.206 | 979 |
| Example 2 | 0.296 | 0.148 | 984 |
| Comparative Example | 0.207 | 0.206 | 986 |

Referring to Table 1, the amounts of the residual lithium present as $Li_2CO_3$ or LiOH on the surfaces of the positive electrode active materials of examples were equal or smaller than that of the positive electrode active material of comparative example, and examples of the present invention including at least either one of the water-soluble ammonium-based organic compound and the water-soluble amine-based organic compound in the washing water or at least either one of the water-soluble ammonium-based organic compound and the water-soluble amine-based organic compound and a metal oxide in the positive electrode active materials maintained lithium-washing power and exhibited much improved thermal characteristics, cycle-life characteristics, voltage drop, and capacity vs. voltage and thus excellent battery characteristics.

Hereinbefore, the certain exemplary embodiments of the present invention have been described and illustrated, however, it is apparent to a person with ordinary skill in the art that the present invention is not limited to the exemplary embodiment as described, and may be variously modified and transformed without departing from the spirit and scope of the present invention. Accordingly, the modified or transformed exemplary embodiments as such may not be understood separately from the technical ideas and aspects of the present invention, and the modified exemplary embodiments are within the scope of the claims of the present invention.

The invention claimed is:

1. A method of preparing a positive electrode active material, comprising
   (i) forming a positive electrode active material through a heat treatment process; and
   (ii) washing the positive electrode active material with washing water including at least one of a water-soluble ammonium-based organic compound and a water-soluble amine-based organic compound,
   wherein the positive electrode active material comprises a core including lithium nickel composite oxide represented by Chemical Formula 1:

$Li_aNi_xCo_yM_zO_2$ [Chemical Formula 1]

wherein, in Chemical Formula 1,
   M is one or two or more a metal element selected from Al, Cr, Fe, V, Mg, Ti, Zr, Nb, Mo, W, Cu, Zn, Ga, In, Sn, La, and Ce,
   $0.9 \leq a \leq 1.05$,
   $0.7 \leq x < 1.0$,
   $0.01 \leq y \leq 0.3$,
   $0.01 \leq z \leq 0.3$, and
   $x+y+z=1$,
   wherein the prepared positive electrode active material has a surface layer present on the core, the surface layer includes at least one of a water-soluble ammonium-based organic compound and a water-soluble amine-based organic compound derived from the washing water, and
   wherein an area of the surface layer is 0.1% to 10% of the total surface area of the core.

2. The method of claim 1, wherein at least one of the water-soluble ammonium-based organic compound and the water-soluble amine-based organic compound is included in an amount of 0.1 wt % to 10 wt % based on a total weight of the washing water.

3. The method of claim 1, wherein
   the washing water further comprises a metal oxide, and
   the washing of the positive electrode active material comprises washing the positive electrode active material with washing water that further comprises the metal oxide.

4. The method of claim 3, wherein the metal oxide is included in an amount of 0.1 wt % to 5 wt % based on a total weight of the washing water.

5. A lithium secondary battery comprising
   a positive electrode comprising a positive electrode current collector, and a positive electrode active material layer disposed on the positive electrode current collector;
   a negative electrode facing the positive electrode and including a negative electrode current collector and a negative electrode active material layer disposed on the negative electrode current collector; and
   an electrolyte,
   wherein the positive electrode active material layer comprises a positive electrode active material manufactured by the method of claim 1, and a positive electrode binder.

* * * * *